United States Patent
Fujino

(10) Patent No.: US 11,143,076 B2
(45) Date of Patent: Oct. 12, 2021

(54) UREA WATER SPRAYING DEVICE

(71) Applicant: ISUZU MOTORS LIMITED, Tokyo (JP)

(72) Inventor: Ryusuke Fujino, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/958,561

(22) PCT Filed: Dec. 25, 2018

(86) PCT No.: PCT/JP2018/047479
§ 371 (c)(1),
(2) Date: Jun. 26, 2020

(87) PCT Pub. No.: WO2019/131594
PCT Pub. Date: Jul. 4, 2019

(65) Prior Publication Data
US 2020/0340382 A1  Oct. 29, 2020

(30) Foreign Application Priority Data

Dec. 27, 2017  (JP) .............................. JP2017-250867

(51) Int. Cl.
*F01N 3/10* (2006.01)
*F01N 3/20* (2006.01)
(Continued)

(52) U.S. Cl.
CPC ....... *F01N 3/2066* (2013.01); *B01D 53/9418* (2013.01); *B01D 53/9431* (2013.01);
(Continued)

(58) Field of Classification Search
CPC ........ F01N 3/2066; F01N 3/0842; F01N 3/30; F01N 2610/1453; B01D 53/9418; B01D 53/9431
(Continued)

(56) References Cited

U.S. PATENT DOCUMENTS 8,011,176 B2 *  9/2011  Hirata .................... F01N 3/206
                                                          60/286
8,438,839 B2 *  5/2013  Floyd .................... F01N 3/2066
                                                          60/286
(Continued)

FOREIGN PATENT DOCUMENTS

CN  106414932 A  2/2017
CN  106437970 A  2/2017
(Continued)

OTHER PUBLICATIONS

English translation of Japanese Patent Application No. JP 2008-267269A (Year: 2008).*
(Continued)

*Primary Examiner* — Jason D Shanske
(74) *Attorney, Agent, or Firm* — Procopio, Cory, Hargreaves & Savitch LLP

(57) ABSTRACT

A urea water spraying device 20 is provided with: a urea water spraying nozzle 22 for spraying urea water into an exhaust passageway 3 of an engine 2; an assist gas spraying nozzle 23 for spraying an assist gas for promoting atomization of the urea water that has been sprayed by suctioning the urea water sprayed from the urea water spraying nozzle 22 and blowing the urea water into the exhaust passageway 3; and an assist gas supply passageway 27 for supplying the assist gas spraying nozzle 23 with exhaust passing through the exhaust passageway 3 as the assist gas.

4 Claims, 2 Drawing Sheets

(51) Int. Cl.
  *B01D 53/94* (2006.01)
  *B05B 7/04* (2006.01)
  *F01N 3/021* (2006.01)
  *F01N 3/08* (2006.01)
  *F01N 3/30* (2006.01)

(52) U.S. Cl.
  CPC ............ *B05B 7/0475* (2013.01); *F01N 3/021* (2013.01); *F01N 3/0842* (2013.01); *F01N 3/30* (2013.01); *B01D 2255/1021* (2013.01); *B01D 2255/1023* (2013.01); *F01N 2610/02* (2013.01); *F01N 2610/1453* (2013.01)

(58) Field of Classification Search
  USPC .......................................................... 60/301
  See application file for complete search history.

(56) References Cited

U.S. PATENT DOCUMENTS

| | | | | |
|---|---|---|---|---|
| 9,708,956 | B1* | 7/2017 | Zhang | F01N 3/208 |
| 2005/0013756 | A1* | 1/2005 | Amou | B01D 53/9495 |
| | | | | 423/239.1 |
| 2009/0126687 | A1 | 5/2009 | Paterson | |
| 2009/0158717 | A1* | 6/2009 | Kimura | F01N 13/08 |
| | | | | 60/295 |
| 2010/0005790 | A1* | 1/2010 | Zhang | F01N 3/36 |
| | | | | 60/301 |
| 2010/0212292 | A1* | 8/2010 | Rusch | F01N 13/08 |
| | | | | 60/274 |
| 2015/0361849 | A1* | 12/2015 | Chiruta | F01N 3/2892 |
| | | | | 60/301 |

FOREIGN PATENT DOCUMENTS

| | | | |
|---|---|---|---|
| EP | 3130775 | A1 | 2/2017 |
| JP | 2001173431 | A | 6/2001 |
| JP | 2004308549 | A | 11/2004 |
| JP | 2008267269 | A * | 11/2008 |
| JP | 2011504220 | A | 2/2011 |
| JP | 2015212530 | A | 11/2015 |
| JP | 2018076801 | A * | 5/2018 |

OTHER PUBLICATIONS

English translation of Japanese Patent Application No. JP 2004-308549A (Year: 2004).*
English translation of Japanese Patent Application No. JP 2008-267269A (Year: 2001).*
International Search Report and Written Opinion for related PCT App No. PCT/JP2018/047479 dated Feb. 12, 2019, 9 pgs. (partial translation).
Office Action dated Jun. 18, 2021 from corresponding CN Patent Application No. 201880084031.6, 25 pages.

* cited by examiner

UREA WATER SPRAYING DEVICE

CROSS-REFERENCE TO RELATED APPLICATIONS

This application is a U.S. National Stage entry of PCT Application No: PCT/JP2018/047479 filed Dec. 25, 2018, which claims priority to Japanese Patent Application No. 2017-250867 filed Dec. 27, 2017, the contents of which are incorporated herein by reference.

TECHNICAL FIELD

The present disclosure relates to a urea water spraying device.

BACKGROUND ART

In related art, there has been known an exhaust purification device that purifies NOx in an exhaust gas discharged from an engine by using ammonia generated by hydrolysis of urea water (for example, see Patent Literature 1). In general, such an exhaust purification device includes a urea water spraying device having a urea water spraying nozzle that sprays the urea water into an exhaust passage of the engine.

In related art, as the urea water spraying device, there has been known a type of urea water spraying device that promotes atomization of urea water sprayed from a urea water spraying nozzle by sucking the sprayed urea water with an assist gas and blows the urea water into an exhaust passage (for example, see Patent Literature 2). Specifically, Patent Literature 2 discloses the urea water spraying device that uses pressurized air supplied from a pressurized air supply source (a pressurized air tank, an air pump or the like) as the assist gas.

CITATION LIST

Patent Literature

Patent Literature 1: JP-A-2015-212530
Patent Literature 2: JP-A-2001-173431

SUMMARY OF INVENTION

Technical Problem

In a case of the related art as described above, since the pressurized air supplied from the pressurized air supply source is used as the assist gas, the urea water spraying device cannot be easily applied to a vehicle (for example, a small commercial vehicle or a passenger vehicle) having no pressurized air supply source.

The present disclosure has been made in view of the above circumstances, and an object thereof is to provide a urea water spraying device that may promote atomization of urea water without using a pressurized air supply source, and thus may be easily applied to a vehicle having no pressurized air supply source.

Solution to Problem

In order to achieve the above object, a urea water spraying device according to an aspect of the present disclosure includes: a urea water spraying nozzle configured to spray urea water into an exhaust passage of an engine: an assist gas spraying nozzle configured to spray an assist gas for promoting atomization of the urea water sprayed from the urea water spraying nozzle by sucking the sprayed urea water and blowing the urea water into the exhaust passage; and an assist gas supply passage configured to supply the assist gas spraying nozzle with an exhaust gas passing through the exhaust passage as the assist gas.

Advantageous Effects of Invention

According to the above-described urea water spraying device, since the atomization of the urea water is promoted by using the exhaust gas passing through the exhaust passage of the engine as the assist gas, the atomization of the urea water may be promoted without using a pressurized air supply source. Thereby, the urea water spraying device may be easily applied to a vehicle having no pressurized air supply source.

DESCRIPTION OF EMBODIMENTS

Hereinafter, a urea water spraying device 20 according to the present embodiment will be described with reference to the drawings. Specifically, a schematic configuration of a vehicle 1 to which the urea water spraying device 20 according to the present embodiment is applied will be described first, and then details of the urea water spraying device 20 will be described.

Figure 1:
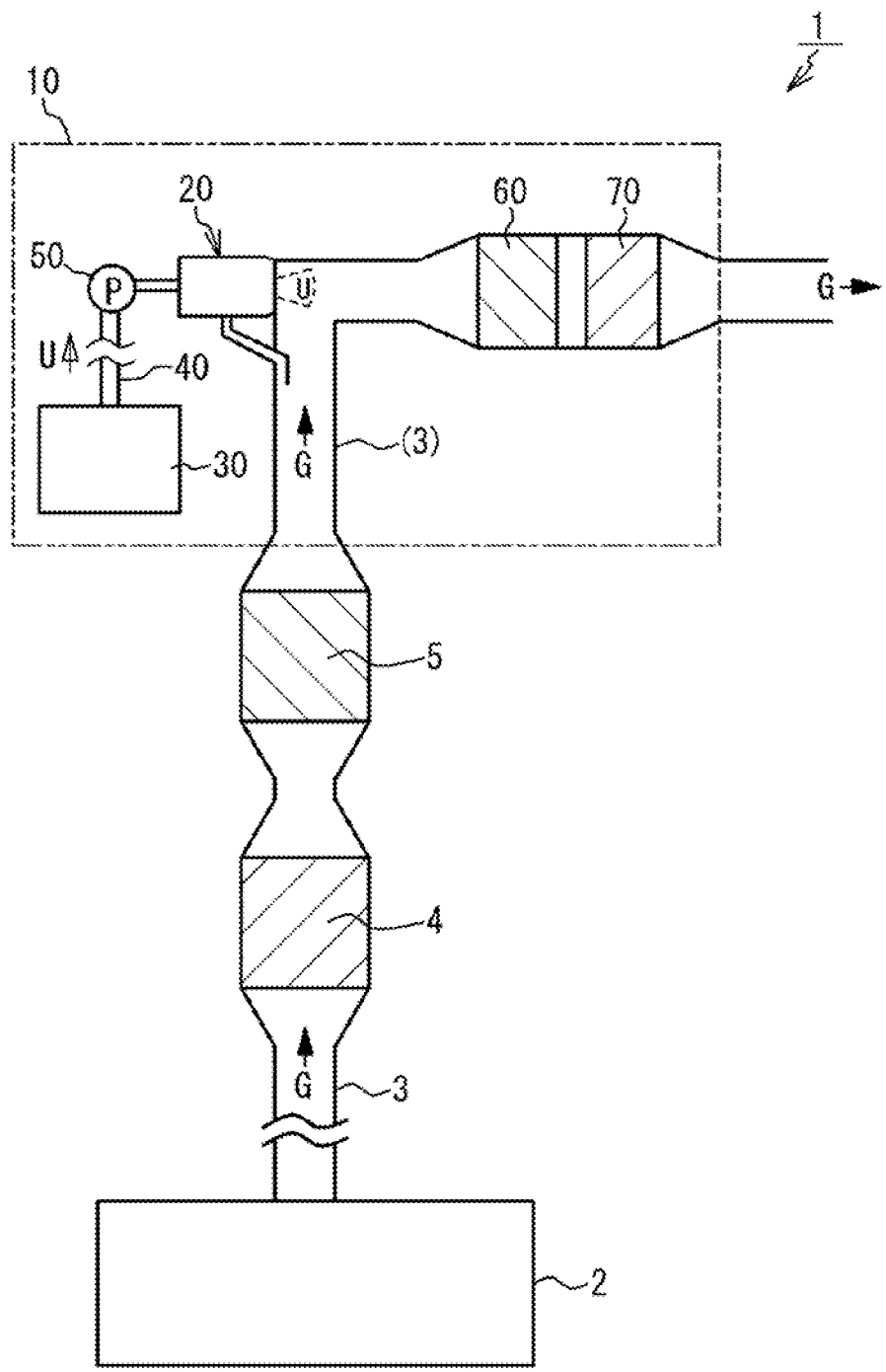
FIG. 1 is a configuration view schematically showing a configuration of a vehicle according to an embodiment.

FIG. 1 is a configuration view schematically showing the configuration of the vehicle 1. A specific type of the vehicle 1 is not particularly limited, and various vehicles such as a small commercial vehicle, a passenger vehicle and a large commercial vehicle may be used. The vehicle 1 includes an engine 2 and an exhaust passage 3 through which an exhaust gas (G) discharged from the engine 2 passes. In the present embodiment, a diesel engine is used as an example of the engine 2.

The vehicle 1 also includes an oxidation catalyst 4 disposed in the exhaust passage 3, and a filter 5 disposed in the exhaust passage 3 downstream of the oxidation catalyst 4 in an exhaust flow direction. The filter 5 is a filter for removing PM (particulate matters), which collects and removes the PM contained in the exhaust gas. A specific type of the filter 5 is not particularly limited as long as the filter 5 has such a function, and a wall-flow type diesel particulate filter is used as an example of the filter 5 in the present embodiment. The oxidation catalyst 4 has a configuration in which a noble metal catalyst such as platinum (Pt) or palladium (Pd) is supported on a carrier through which the exhaust gas may pass. The oxidation catalyst 4 promotes an oxidation reaction that nitrogen monoxide (NO) in the exhaust gas is changed into nitrogen dioxide ($NO_2$) by oxidation catalytic action of the noble metal catalyst. When an exhaust temperature is equal to or higher than a predetermined temperature, the PM of the filter 5 may be burned by the nitrogen dioxide generated in the oxidation catalyst 4 and discharged as carbon dioxide ($CO_2$).

The vehicle 1 also includes an exhaust purification device 10. The exhaust purification device 10 is an exhaust purification device that purifies NOx in the exhaust gas discharged from the engine 2 by using ammonia generated by hydrolysis of urea water (U). Specifically, the exhaust purification device 10 according to the present embodiment includes the urea water spraying device 20, and includes a urea water storage unit 30, a urea water supply passage 40, a pump 50, a NOx selective reduction catalyst 60 and an ammonia slip catalyst 70. The urea water spraying device 20 is a device that sprays the urea water into the exhaust passage 3. The details of the urea water spraying device 20 will be described below.

The urea water storage unit 30 is a portion that stores the urea water, and a tank (that is, a urea water storage tank) is used in the present embodiment. The urea water supply passage 40 is a pipe that supplies the urea water in the urea water storage unit 30 to the urea water spraying device 20.

The pump 50 is disposed in the urea water supply passage 40, and is a pump that pumps the urea water toward the urea water spraying device 20. A specific configuration of the pump 50 is not particularly limited, and a piston type pressure feed pump that pumps the urea water by driving a piston by an electromagnetic solenoid is used as an example in the present embodiment. Pressure of the urea water pumped by the pump 50 is not particularly limited, and is about 2 bar in the present embodiment. An operation of the pump is controlled by a control device (not shown).

The NOx selective reduction catalyst 60 is disposed in the exhaust passage 3 at a position downstream of the filter 5 in the exhaust flow direction. The NOx selective reduction catalyst 60 is a catalyst that selectively reduces the NOx in the exhaust gas by using the ammonia ($NH_3$) generated by the hydrolysis of the urea water sprayed from the urea water spraying device 20. A specific type of the NOx selective reduction catalyst 60 is not particularly limited, and known NOx selective reduction catalysts such as vanadium (V), molybdenum (Mo), tungsten (W) and zeolite may be used.

Spray particles of the urea water sprayed from the urea water spraying device 20 are vaporized and hydrolyzed in the exhaust gas. As a result, the ammonia is generated. The ammonia reduces the NOx in the exhaust gas under catalytic action of the NOx selective reduction catalyst 60. As a result, nitrogen and water are generated. In this way, the exhaust purification device 10 aims to reduce the NOx in the exhaust gas.

The ammonia slip catalyst 70 is disposed in the exhaust passage 3 downstream of the NOx selective reduction catalyst 60 in the exhaust flow direction, and is an oxidation catalyst that oxidizes the ammonia that has passed through the NOx selective reduction catalyst 60. According to the present embodiment, since such an ammonia slip catalyst 70 is provided, the ammonia that has passed through the NOx selective reduction catalyst 60 is effectively prevented from being discharged to outside of the vehicle 1 together with the exhaust gas.

Figure 2:
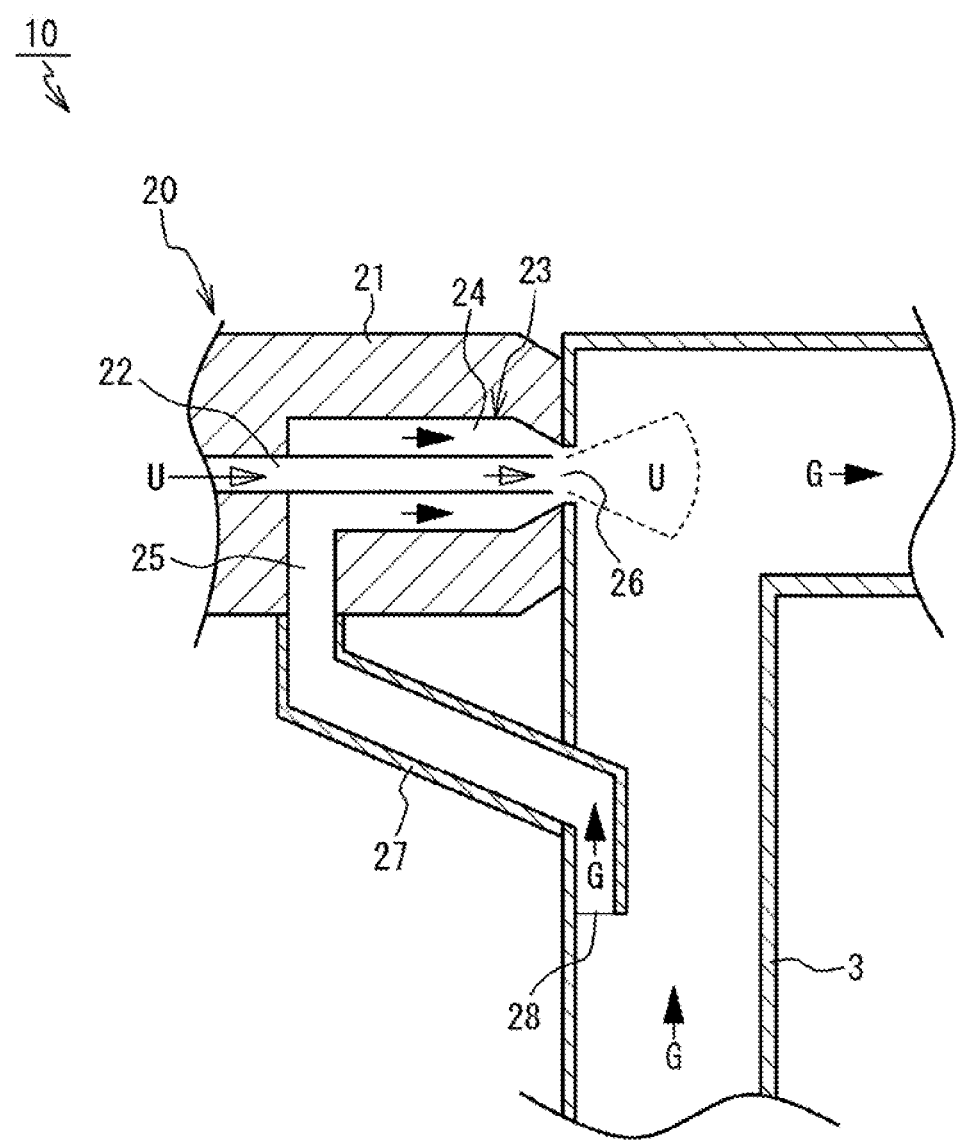
FIG. 2 is a schematic cross-sectional view schematically showing a configuration of a urea water spraying device according to the embodiment.

Next, the details of the urea water spraying device 20 will be described. FIG. 2 is a schematic cross-sectional view schematically showing a configuration of the urea water spraying device 20. The urea water spraying device 20 includes a body 21, a urea water spraying nozzle 22, an assist gas spraying nozzle 23 and an assist gas supply passage 27. In FIG. 2, a peripheral structure of a distal end portion of the body 21 of the urea water spraying device 20 is schematically shown in cross section.

A spraying hole 26 through which the urea water is sprayed is formed at the distal end portion of the body 21. The body 21 is connected to a pipe wall portion of the exhaust passage 3 such that the spraying hole 26 communicates with a hole for the spraying hole, which is formed in the pipe wall portion of the exhaust passage 3.

The urea water spraying nozzle 22 is a nozzle that sprays the urea water into the exhaust passage 3, and the urea water is sprayed toward a position in the exhaust passage 3 downstream of the filter 5 in the exhaust flow direction and upstream of the NOx selective reduction catalyst 60 in the exhaust flow direction in the present embodiment. A downstream end portion of the urea water supply passage 40 communicates with an upstream end portion of the urea water spraying nozzle 22. Thereby, the urea water that is pumped by the pump 50 and has passed through the urea water supply passage 40 is supplied to the urea water spraying nozzle 22.

The assist gas spraying nozzle 23 is a nozzle that sprays an assist gas. As will be described below, the exhaust gas passing through the exhaust passage 3 is used as the assist gas in the present embodiment. The assist gas sprayed from the assist gas spraying nozzle 23 promotes atomization of the urea water sprayed from the urea water spraying nozzle 22 (that is, assists the atomization of the urea water) by utilizing a so-called mist spraying principle. Specifically, the assist gas sprayed from the assist gas spraying nozzle 23 sucks the urea water sprayed from the urea water spraying nozzle 22 and blows the urea water into the exhaust passage 3 to promote the atomization of the urea water sprayed from the urea water spraying nozzle 22.

More specifically, the assist gas spraying nozzle 23 according to the present embodiment, as an example, includes a first portion 24 disposed coaxially with the urea water spraying nozzle 22 at a position extending from a distal end portion of the assist gas spraying nozzle 23 toward a proximal end side (a side opposite to a distal end side) by a predetermined distance so as to surround a periphery of the urea water spraying nozzle 22, and also includes a second portion 25 communicating with an upstream end portion of the first portion 24 and bent approximately 90 degrees with respect to an axis of the first portion 24. A downstream end portion of the assist gas supply passage 27 described below is connected to an upstream end portion of the second portion 25. A distal end portion of the first portion 24 is connected to the spraying hole 26 of the body 21. A region near the distal end portion of the first portion 24 has a conical shape whose diameter decreases toward the distal end portion. A relative position of the distal end portion (the spraying hole 26) of the first portion 24 with respect to a distal end portion of the urea water spraying nozzle 22 is set such that the urea water sprayed from the urea water spraying nozzle 22 is sucked by the assist gas sprayed from the assist gas spraying nozzle 23. Thereby, the assist gas sprayed from the assist gas spraying nozzle 23 sucks the urea water and blows the urea water into the exhaust passage 3 to promote the atomization of the urea water.

The urea water whose atomization is promoted by the assist gas is atomized and supplied into the exhaust passage 3. An average atomized particle size of the atomized urea water is not particularly limited, and is a value within a range of 20 μm to 50 μm as an example in the present embodiment. The atomization of the urea water is promoted in this way, so that the ammonia may be efficiently generated.

According to the present embodiment, since the assist gas spraying nozzle 23 includes the first portion 24 (a portion disposed coaxially with the urea water spraying nozzle 22 so as to surround the periphery of the urea water spraying nozzle 22) as described above, a size of the urea water spraying device 20 is entirely compact.

The assist gas supply passage 27 is a pipe portion that supplies the assist gas spraying nozzle 23 with the exhaust gas (G) passing through the exhaust passage 3 as the assist gas.

Specifically, an upstream end portion of the assist gas supply passage 27 according to the present embodiment is open, and the upstream end portion serves as an assist gas intake port 28 that takes the assist gas (specifically, the exhaust gas) into the assist gas supply passage 27. The assist gas intake port 28 is disposed at a position in the exhaust passage 3 downstream of the filter 5 in the exhaust flow direction and upstream of a position where the urea water is sprayed from the urea water spraying nozzle 22 (hereinafter referred to as a urea water spraying position) in the exhaust flow direction. As described above, the downstream end portion (that is, an assist gas discharge port) of the assist gas supply passage 27 is connected to an upstream end portion (specifically, the upstream end portion of the second portion 25) of the assist gas spraying nozzle 23.

Thereby, a part of the exhaust gas in the exhaust passage 3 downstream of the filter 5 and upstream of the urea water spraying position is taken into the assist gas supply passage 27, is then supplied to the assist gas spraying nozzle 23 through the assist gas supply passage 27, and is sprayed as the assist gas from the assist gas spraying nozzle 23.

An arrangement position of the assist gas intake port 28 in the exhaust passage 3 may be any position where the exhaust gas in the exhaust passage 3 may be taken into the assist gas supply passage 27, and the specific arrangement position thereof is not limited to a portion shown in FIG. 2. As another example, the assist gas intake port 28 may be disposed at a position downstream of the urea water spraying position in the exhaust passage 3 or at a position upstream of the filter 5 in the exhaust passage 3, as long as it is a position where the exhaust gas in the exhaust passage 3 can be taken into the assist gas supply passage 27.

According to the urea water spraying device 20 according to the present embodiment as described above, since the atomization of the urea water is promoted by using the exhaust gas passing through the exhaust passage 3 instead of using pressurized air supplied from a pressurized air supply source (a pressurized air tank, an air pump or the like) as the assist gas, the atomization of the urea water may be promoted without using the pressurized air supply source. Thereby, the urea water spraying device 20 may be easily applied to a vehicle (for example, a small commercial vehicle or a passenger vehicle) having no pressurized air supply source.

According to the present embodiment, since the exhaust gas is used as the assist gas, evaporation of the urea water may also be promoted by heat of the exhaust gas. Thereby, since a chemical reaction for generating the ammonia from the urea water may be promoted, a generation amount of the ammonia may be increased. As a result, a purification rate of the NOx may be improved.

According to the present embodiment, since the assist gas intake port 28 of the assist gas supply passage 27 is disposed at a position in the exhaust passage 3 downstream of the filter 5 in the exhaust flow direction and upstream of the urea water spraying position in the exhaust flow direction, the exhaust gas after the PM is removed by the filter 5 (that is, clean exhaust gas) may be used as the assist gas, and a part of the urea water sprayed from the urea water spraying nozzle 22 may be prevented from being taken into the assist gas supply passage 27.

Although the preferred embodiment of the present invention has been described above, the present invention is not limited to such a specific embodiment, and various modifications and changes may be made within the scope of the gist of the present invention described in the claims.

The present application is based on Japanese Patent Application No. 2017-250867 filed on Dec. 27, 2017, contents of which are incorporated herein by reference.

INDUSTRIAL APPLICABILITY

The urea water spraying device according to the present disclosure is useful in that the atomization of the urea water may be promoted without using the pressurized air supply source, and thus the urea water spraying device may be easily applied to the vehicle having no pressurized air supply source.

REFERENCE SIGNS LIST 1 vehicle
2 engine
3 exhaust passage
10 exhaust purification device
20 urea water spraying device
22 urea water spraying nozzle
23 assist gas spraying nozzle
27 assist gas supply passage
30 urea water storage unit
40 urea water supply passage
50 pump
60 NOx selective reduction catalyst

The invention claimed is:

1. A urea water spraying device comprising:
a urea water spraying nozzle that is configured to spray urea water into an exhaust passage of an engine;
an assist gas spraying nozzle that is configured to spray, an assist gas for promoting atomization of the urea water sprayed from the urea water spraying nozzle by sucking the sprayed urea water and blowing the urea water into the exhaust passage; and
an assist gas supply passage that is configured to supply the assist gas spraying nozzle with an exhaust gas passing through the exhaust passage as the assist gas,
wherein the assist gas spraying nozzle includes a first portion disposed coaxially with the urea water spraying nozzle so as to surround a periphery of the urea water spraying nozzle, and
wherein a distal end portion of the assist nozzle extends further to the exhaust passage than a distal end portion of the urea water spraying nozzle.

2. The urea water spraying device according to claim 1, wherein the urea water spraying nozzle sprays the urea water toward a position in the exhaust passage downstream of a filter disposed in the exhaust passage in an exhaust flow direction and upstream of a NOx selective reduction catalyst disposed in the exhaust passage in the exhaust flow direction, and
wherein an assist gas intake port of the assist gas supply passage is disposed at a position in the exhaust passage downstream of the filter in the exhaust flow direction and upstream of a position where the urea water is sprayed from the urea water spraying nozzle in the exhaust flow direction.

3. The urea water spraying device according to claim 1, wherein the assist gas spraying nozzle includes a second portion communicating with the first portion and bent 90 degrees with respect to an axis of the first portion.

4. The urea water spraying device according to claim 1, wherein a region at a distal end portion of the first portion has a conical shape whose diameter decreases toward the distal end portion of the first portion.

\* \* \* \* \*